July 11, 1961 G. A. FRANCO 2,992,427
POLARIZATION MODULATION DATA TRANSMISSION SYSTEM
Filed Feb. 19, 1960 2 Sheets-Sheet 1

INVENTOR.
GEORGE A. FRANCO
BY George J. Seligsohn
ATTORNEY

POLARIZATION MODULATION DATA TRANSMISSION SYSTEM

Filed Feb. 19, 1960

2,992,427
Patented July 11, 1961

2,992,427

POLARIZATION MODULATION DATA TRANSMISSION SYSTEM

George A. Franco, Pittsford, N.Y., assignor to General Dynamics Corporation, Rochester, N.Y., a corporation of Delaware Filed Feb. 19, 1960, Ser. No. 9,755
14 Claims. (Cl. 343—100)

This invention relates to radio-link data transmission systems and, more particularly, to such a system utilizing polarization shift modulation to transmit a plurality of binary data signals over a single carrier frequency channel.

Line-of-sight radio links are often used to transmit data information. It is desirable that such a link be capable of transmitting a maximum amount of data with minimum error over a carrier frequency channel of minimum bandwidth. The present invention contemplates a relatively simple system incorporating these desirable features.

More specifically, in the present invention, the same carrier frequency is separately keyed by two binary data signals. One of the keyed signals is transmitted to a receiving location by a radio wave having a first type of polarization and the other keyed signal is transmitted to the receiving location by a radio wave having a different type of polarization. At the receiving location, one keyed signal is received by antenna means responsive only to the first-mentioned type of polarization and the other keyed signal is received by antenna means responsive only to the second-mentioned type of polarization. In this manner, a single carrier frequency may be utilized to transmit two different binary signals.

One of the usual problems encountered in transmitting data by radio is that due to noise, etc., spurious signals may be received by the receiving antenna means. These spurious signals may often be mistaken for data signals, creating error at the receiver. In order to minimize this sort of error, the present invention utilizes detecting means at the receiver which incorporate correlation techniques.

It is therefore an object of the present invention to provide an improved radio-link data transmission system.

It is a further object of this invention to provide a radio-link data transmission system incorporating polarization shift modulation of the same carrier frequency to transmit two binary data signals.

It is a still further object of this invention to provide a radio-link data transmission system utilizing correlation of techniques at the receiver for minimizing transmission errors.

These and other objects, features and advantages of the present invention will become more apparent from the following detailed description taken together with the accompanying drawings, in which.

Figure 1:
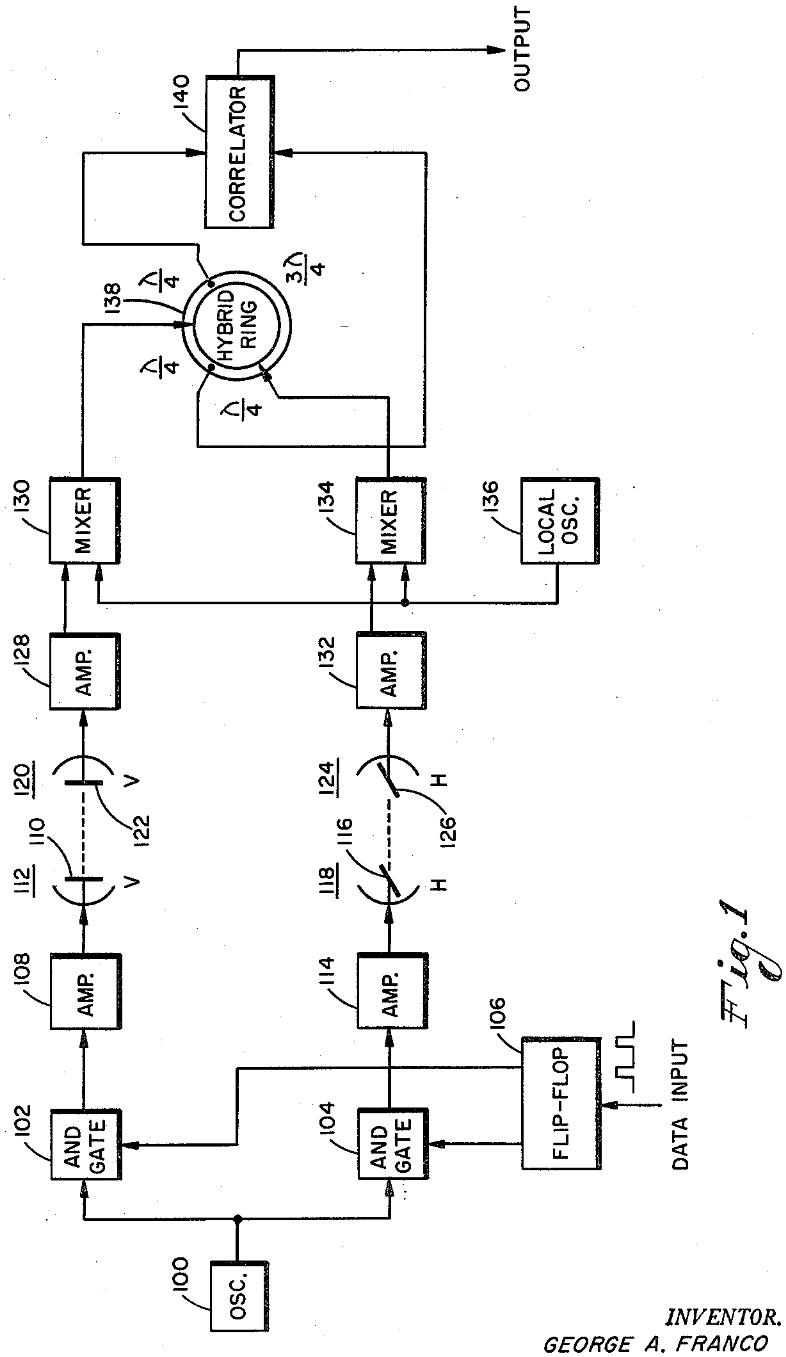
FIG. 1 is a block diagram of a first preferred embodiment of the invention.

Referring now to FIG. 1, oscillator 100 applies a microwave carrier frequency signal as a first input to AND gate 102 and as a first input to AND gate 104.

A data input made up of "mark" signals, manifested by the presence of a pulse, and "space" signals, manifested by the absence of a pulse, is applied as an input to flip-flop 106. Flip-flop 106 has two separate outputs of opposite polarity. The polarity of the two outputs of flip-flop 106 are reversed only during the presence of a "mark" signal pulse applied as an input thereto.

One of the outputs of flip-flop 106 is applied as a second input to AND gate 102 and the other output of flip-flop 106 are reversed only during the presence of a 104. AND gate 102 is effective in passing the carrier frequency signal applied as a first input thereto only when the output from flip-flop 106 applied as a second input thereto has a given polarity, and AND gate 104 is effective in passing the carrier frequency signal applied as a first input thereto only when the output from flip-flop 106 applied as a second input thereto has this given polarity.

Since the two outputs of flip-flop 106 are always of opposite polarity, it will be seen that only one of AND gates 102 and 104 will have the given polarity applied as a second input thereto at any given time. Assume that the output of flip-flop 106 applied as a second input to AND gate 102 has the given polarity only during the presence of a "mark" signal applied to flip-flop 106 and that the output of flip-flop 106 applied as a second input to AND gate 104 has the given polarity applied as a second input thereto only during the presence of a "space" signal applied as an input to flip-flop 106. Then, only during the presence of a "mark" signal will the carrier frequency signal from oscillator 100 be passed by AND gate 102 and applied, as shown, through amplifier 108 to the vertically oriented driving element 110 of directional antenna 112. Similarly, only during the presence of a "space" signal will the carrier frequency signal from oscillator 100 be passed by AND gate 104 and applied, as shown, through amplifier 114 to the driving element of horizontally oriented driving element 116 of antenna 118.

If the carrier signal is of great enough amplitude, amplifiers 108 and 114 may be omitted.

Since the driving element 110 is vertically oriented, it will radiate vertically polarized electromagnetic energy in response to the carrier frequency signal being applied thereto, and since driving element 116 is horizontally oriented, it will radiate horizontally polarized electromagnetic energy in response to the carrier frequency signal being applied thereto.

Although, as shown, driving elements 110 and 116 are incorporated in separate antennas, they may both be incorporated in a single antenna, i.e., a single reflector may be utilized for both driving elements 110 and 116. Furthermore, it is only essential that the two driving elements be oriented to provide two different types of polarization. Thus, for instance, instead of driving element 110 being oriented to provide vertical polarization, it could be oriented to provide clockwise circular polarization, and instead of driving element 116 being oriented to provide horizontal polarization, it could be oriented to provide counterclockwise circular polarization.

At a distant point, located in line-of-sight relationship with antenna 112, is directional receiving antenna 120, including vertically oriented sensing element 122 for receiving the electromagnetic energy radiated by antenna 112. Similarly, located in line-of-sight relationship with antenna 118 is directional receiving antenna 124, including horizontally oriented sensing element 126 for receiving the horizontally polarized electromagnetic energy radiated by antenna 18.

The output from sensing element 122, which is at the carrier frequency, is applied through amplifier 128 as a first input to mixer 130, and the output from sensing element 126, which is at the carrier frequency, is applied through amplifier 132 as a first input to mixer 134. Amplifiers 128 and 132 may be dispensed with if the outputs of sensing elements 122 and 126 are great enough. A signal from local oscillator 136, which has a frequency other than the carrier frequency, is applied as a second input to both mixer 130 and mixer 134.

Each of mixers 130 and 134, in response to signals applied to both the first and second inputs thereof, produces an output signal at a selected one of the beat frequencies of the carrier frequency and the local oscillator frequency.

The output from mixer 130 is applied as a first input to hybrid ring 138 and the output from mixer 134 is applied as a second input to hybrid ring 138.

Hybrid ring 138 is a circular waveguide having a circumferential extent of one and one-half wavelengths at the applied beat frequency. In addition to the two inputs, discussed above, hybrid ring 138 includes, as shown, two outputs. The input to hybrid ring 138 from mixer 130 is located, as shown, intermediate the two outputs from hybrid ring 138 and is spaced a quarter wavelength at the beat frequency from each of the outputs of hybrid ring 138, and the input to hybrid ring 138 from mixer 134 is spaced a quarter wavelength at the beat frequency beyond one of the outputs of hybrid ring 138 and three-quarters of a wavelength at the beat frequency from the other output of hybrid ring 138. Therefore, an input to hybrid ring 138 from mixer 130 will result in in-phase signals being derived at the two outputs of hybrid ring 138, and an input to hybrid ring 138 from mixer 134 will result in 180° out-of-phase signals being derived at the outputs of hybrid ring 138.

One output of hybrid ring 138 is applied, as shown, as a first input to correlator 140 and the other output from hybrid ring 138 is applied as a second input to correlator 140. Correlators, which are well known in the art, include a multiplying circuit followed by an averaging integrating circuit. The multiplying circuit, for instance, may be composed of a balanced ring modulator. The output from correlator 140 will, therefore, be a D.C. signal having a magnitude and polarity which is equal to the average of the product of the signals applied as first and second inputs thereto.

Considering now the operation of the data transmission system shown in FIG. 1, it will be seen that during the presence of a "mark" signal, antenna 112 will be radiating vertically polarized electromagnetic energy, while no electromagnetic energy at all will be radiated by antenna 118. On the other hand, during the presence of a "space" signal, antenna 118 will be radiating horizontally polarized electromagnetic energy, while no electromagnetic energy at all will be radiated by antenna 112. Thus, it will be seen that radiation of electromagnetic energy from antennas 112 and 118, respectively, is mutually exclusive.

It then follows that only receiving antenna 120 will receive a carrier frequency signal in response to the presence of a "mark" signal and only receiving antenna 124 will receive a carrier frequency signal in response to the presence of a "space" signal. Therefore, in response to a "mark" signal, the output from mixer 130 applied to the first input of hybrid ring 138 will include a beat frequency signal, while the output of mixer 134 applied to the second input of hybrid ring 138 will not include a beat frequency signal. Similarly, in response to a "space" signal, the output from mixer 134 applied to the second input of hybrid ring 138 will include a beat frequency signal, while the output from mixer 130 applied to the first input of hybrid ring 138 will not include the beat frequency signal.

Since each of the first and second outputs of hybrid ring 138 is spaced one quarter of a wavelength at the beat frequency from the first input, the application of a beat frequency signal to this first input, manifesting a "mark" signal, will result in the beat frequency signal derived at the first output of hybrid ring 138 and applied as a first input to correlator 140 being in phase with the beat frequency signal derived at the second output of hybrid ring 138 and applied to the second input of correlator 140.

Since the beat frequency signal is a sinusoidal function, the product of the first and second inputs to correlator 140 will be a sine$^2$ function, which by trigonometry can be shown to be composed of a direct current component and a double frequency alternating component. The alternating component will be eliminated by the averaging integrating circuit of the correlator, so that the output from the correlator will manifest solely the direct current component. Since, as described above, the first and second inputs to correlator 140 are in phase in response to the presence of a "mark" signal, the direct current component which forms the output from correlator 140 will be positive in polarity.

Since one output of hybrid ring 138 is a quarter wavelength at the beat frequency from the second input to hybrid ring 138, while the other output of hybrid ring 138 is three-quarters wavelength at the beat frequency from the second input to hybrid ring 138, the application of a beat frequency signal to this second input, manifesting a "space" signal, will result in the beat frequency signal derived at the one output and applied as the first input to correlator 140 being 180° out of phase with the other output of hybrid ring 138 applied as a second input to correlator 140. Therefore, in response to the presence of a "space" signal, the direct current component from the output of correlator 140 will be negative in polarity. Thus, a positive output from correlator 140 is indicative of a "mark" signal data input, while a negative output from correlator 140 is indicative of a "space" signal data input.

Figure 2:
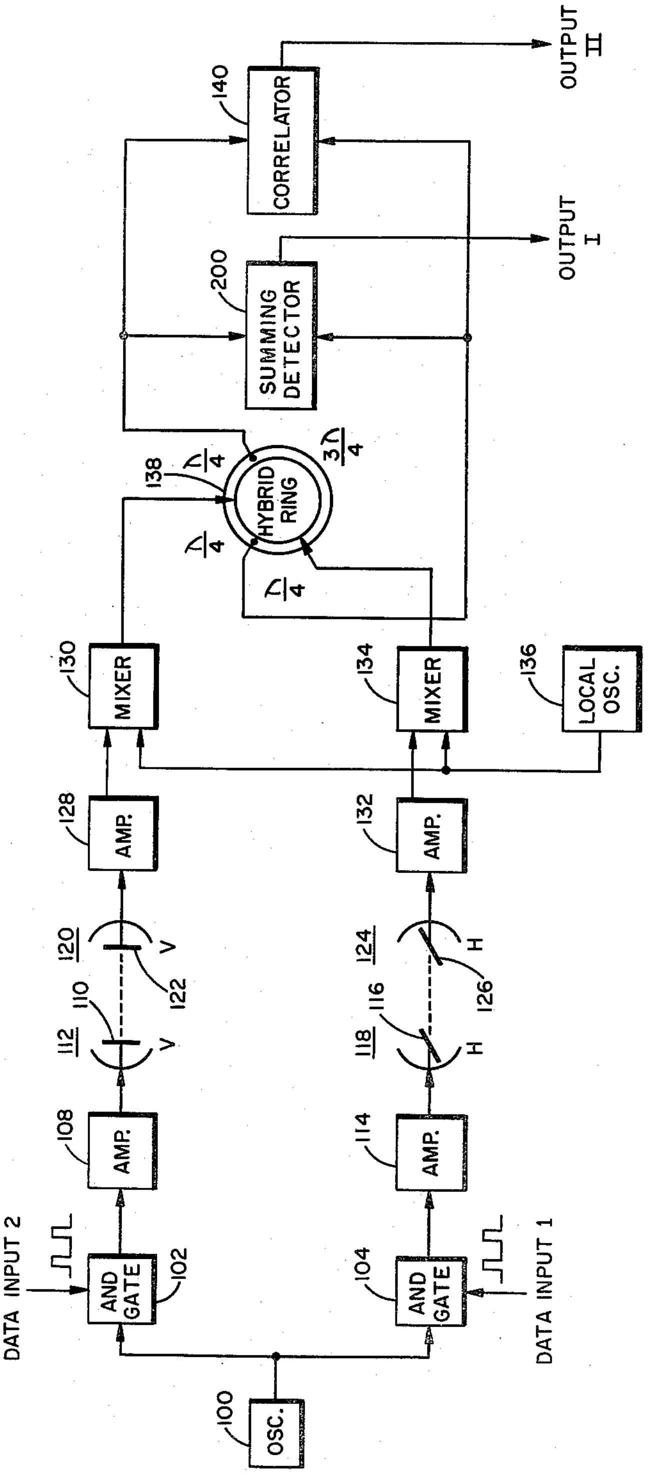
FIG. 2 is a block diagram of a second preferred embodiment of the invention.

Although the embodiment shown in FIG. 1, wherein separate data signals are transmitted in response to "mark" and "space" signals, respectively, provides maximum reliability, it is sometimes desirable to sacrifice a certain amount of reliability in order to transmit two separate independent data inputs. FIG. 2 shows such an embodiment of the data transmission system of the present invention.

In FIG. 2, each of elements 100, 102, 104, 108, 110, 112, 114, 116, 118, 120, 122, 124, 126, 128, 130, 132, 134, 136, 138, and 140 is identical to the corresponding element in FIG. 1 in both structure and function.

FIG. 2 provides two separate and independent data inputs, namely, data input I, which is applied directly as the second input to AND gate 104, and data input II, which is applied directly as the second input to AND gate 102. AND gate 102 is effective in passing the carrier frequency signal from oscillator 100 only when data input II has a "mark" signal present, and AND gate 104 is effective in passing the carrier frequency signal from oscillator 100 only when data input I has a "mark" signal present. Therefore, neither AND gate 102 nor AND gate 104 is effective in passing the carrier frequency signal from oscillator 100 when the data input applied thereto has a "space" signal present.

In FIG. 2, the respective outputs from hybrid ring 138, in addition to being applied as first and second inputs to correlator 140 as in FIG. 1, are also applied as first and second inputs to summing detector 200. Summing detector 200 includes means for summing the outputs from hybrid ring 138 applied as inputs thereto, rectifying the summed signal, and applying the rectified summed signal to an averaging integrating circuit.

Considering now the operation of the embodiment shown in FIG. 2, it will be seen that four transmission conditions are possible. First, in response to both data input I and data input II applying a "space" signal, neither antenna 112 nor antenna 118 transmits a signal. Therefore, in this case, no signals are received and applied to hybrid ring 138. Second, data input I applies a "mark" signal while data input II applies a "space" signal. In this case, a beat frequency signal will be applied to the second input of hybrid ring 138, but no beat frequency signal will be applied to the first input of hybrid ring 138. Third, data input II applies a "mark" signal and data input I applies a "space" signal. In this case, a beat frequency signal will be applied to the first input of hybrid ring 138, but no beat frequency signal will be applied to the second input of hybrid ring 138. Fourth, both data inputs I and II apply a "mark" signal. In this case, a beat frequency signal will be applied to both inputs I and II of hybrid ring 138.

In the first case discussed above, since no signals are applied to hybrid ring 138, no signals will be applied to summing detector 200 or correlator 140, and, therefore, the outputs I and II of summing detector 200 and correlator 140 will each be zero.

In the second case discussed above, since a beat frequency signal is applied only to the second input of hybrid ring 138, the beat frequency signal derived in each of the two outputs of hybrid ring 138 will be 180° out-of-phase with each other, as explained in connection with FIG. 1. Therefore, as explained in connection with FIG. 1, correlator 140 will produce an output II having a negative polarity. Furthermore, since the beat frequency signal outputs from hybrid ring 138 are 180° out-of-phase with each other, the sum of these outputs will be zero, so that summing detector will produce an output I of zero.

In the third case discussed above, since only the first input to hybrid ring 138 has a beat frequency signal applied thereto, the beat frequency signals derived in the two respective outputs of hybrid ring 138 will be in phase with each other, as discussed in connection with FIG. 1. Therefore, as discussed in connection with FIG. 1, output II from correlator 140 will have a positive polarity. Furthermore, the sum of the in-phase beat frequency signal outputs of hybrid ring 138 will produce a positive output I from summing detector 200.

In the fourth case discussed above, beat frequency signals are applied to both the first and second inputs of hybrid ring 138. Since one of the two inputs of hybrid ring 138 is spaced a quarter wavelength at the beat frequency from one of the outputs of hybrid ring 138 and the other input to hybrid ring 138 is spaced three-quarters of a wavelength at the beat frequency from this one output of the hybrid ring 138, out-of-phase components from the two inputs will arrive at this one output of hybrid ring 138. Therefore, this one output from hybrid ring 138 is located at a node, so that the amplitude of the beat frequency signal derived at this output of hybrid ring 138 will be substantially zero.

However, since the other output of hybrid ring 138 is spaced a quarter wavelength at the beat frequency from each of the two inputs thereto, the beat frequency signals arriving at this other output will be in-phase. Therefore, a beat frequency signal of substantial amplitude will be derived at this other output.

Since correlator 140 provides an output signal equal to the average of the product of the two inputs applied thereto, and since one of the inputs applied thereto is zero, output II from correlator 140 will also be zero. However, summing detector 200 provides a direct current output I which is an analog of the sum of the two beat frequency signals applied as an input thereto. Therefore, even though one of the outputs from hybrid ring 138 is zero, the sum of the two outputs from hybrid ring 138 applied to summing detector 200 has a positive magnitude, so that output I from summing detector 200 will have a positive polarity.

Summarizing, in FIG. 2, when both data inputs I and II apply "space" signals, both outputs I and II are both zero; when data input I applies a "mark" signal and data input II applies a "space" signal, output I is zero and output II is negative; when data input I applies a "space" signal and data input II applies a "mark" signal, output I is zero and output II is positive; and when both data inputs I and II apply a "mark" signal, output I is positive and output II is zero.

While there has been disclosed what is at present considered to be the preferred embodiments of the invention, other modifications will readily occur to those skilled in the art. It is not, therefore, desired that the invention be limited to the specific arrangements shown and described and it is intended in the appended claims to cover all such modifications as fall within the true spirit and scope of the invention.

What is claimed is:

1. A data transmission system comprising a transmitter including first radiating means for radiating electromagnetic energy with a first given polarization in response to a signal applied thereto, second radiating means for radiating electromagnetic energy with a second given polarization different from said first given polarization in response to a signal applied thereto, a source of carrier signal having a given frequency, first keying means having a first binary data signal applied thereto for controlling the keying thereof, said first keying means being coupled between said source and said first radiating means for applying said carrier signal to said first radiating means only when said first keying means is keyed on, and second keying means having a second binary data signal applied thereto for controlling the keying thereof, said second keying means being coupled between said source and said second radiating means for applying said carrier signal to said second radiating means only when said second keying means is keyed on.

2. The data transmission system defined in claim 1, wherein said first keying means includes a first AND gate for passing said carrier signal only when said first binary data signal has a given polarity, and wherein said second keying means includes a second AND gate for passing said carrier signal only when said second binary data signal has said given polarity.

3. The data transmission system defined in claim 2, further including a flip-flop having two separate outputs of opposite polarity, means for applying a data input to said flip-flop, said data input including a mark signal characterized by the presence of a pulse and a space signal characterized by the absence of a pulse, said data input reversing the polarity of the two outputs of said flip-flop only during the presence of a pulse, and means for applying one output of said flip-flop as said first binary data signal and for applying the other output of said flip-flop as said second binary data signal.

4. The data transmission system defined in claim 3, further including receiving means including first antenna means for receiving electromagnetic energy of said first polarization radiated by said first radiating means, second antenna means for receiving electromagnetic energy of said second polarization radiated by said second radiating means, and detecting means coupled to both said first and second antenna means for producing an output signal manifesting which antenna means at any given time is receiving said carrier signal.

5. The data transmission system defined in claim 4, wherein said detecting means includes a correlator having an output and first and second inputs for producing a direct current output signal having a magnitude and polarity in accordance with the average with respect to time of the product of the respective signals applied to the first and second inputs thereof, phase delay means having first and second inputs and first and second outputs, the phase delays between said first input of said phase delay means and said respective first and second outputs thereof being such that in response to a signal of a given frequency being applied to said first input thereof the output signals derived from said first and second outputs thereof are substantially in phase with each other and the phase delays between said second input of said phase delay means, and said respective first and second outputs thereof being such that in response to a signal of said given frequency being applied to said second input thereof the output signals derived from said first and second outputs thereof are substantially 180° out-of-phase with each other, means for applying said given frequency signal to said first input of said phase delay means only in response to said first antenna means receiving said electromagnetic energy of said first polarization and for applying said given frequency signal to said second input of said phase delay means only in response to said second antenna means receiving said electromagnetic energy of said second polarization, and means for applying the output signal from said first output of said phase delay means as the first input to said correlator and applying the output signal from said second output of said phase delay means as the second input to said correlator.

6. The data transmission system defined in claim 5, wherein said phase delay means is a hybrid ring.

7. The data transmission system defined in claim 5, wherein said means for applying said given frequency includes a local oscillator, a first mixer coupled to said local oscillator and said first antenna means, a second mixer coupled to said local oscillator and said second antenna means, means for applying the output of said first mixer as said first input to said phase delay means, and means for applying the output of said second mixer as said second input to said phase delay means.

8. The data transmission system defined in claim 2, wherein said first and second binary data signals are independent, and each of said first and second binary data signals includes the occurrence of a mark signal characterized by the presence of said given polarity and the occurrence of a space signal characterized by the absence of said given polarity.

9. The data transmission system defined in claim 8, further including receiving means including first antenna means for receiving electromagnetic energy of said first polarization radiated by said first radiating means, second antenna means for receiving electromagnetic energy of said second polarization radiated by said second radiating means, and detecting means coupled to both said first and second antenna means for producing an output manifesting which antenna means at any given time is receiving said carrier signal.

10. The data transmission system defined in claim 9, wherein said detecting means includes a correlator having an output and first and second inputs for producing a direct current output signal having a magnitude and polarity in accordance with the average with respect to time of the product of the respective signals applied to the first and second inputs thereof, a summing detector having an output and first and second inputs for producing an output signal having a magnitude and polarity in accordance with the average with respect to time of the algebraic sum of the respective signals applied to the first and second inputs thereof, phase delay means having first and second inputs and first and second outputs, the phase delays between said first input of said phase delay means and said respective first and second outputs thereof being such that in response to a signal of a given frequency being applied to said first input thereof the output signals derived from said first and second outputs thereof are substantially in phase with each other and the phase delays between said second input of said phase delay means and said respective first and second outputs thereof being such that in response to a signal of said given frequency being applied to said second input thereof the output signals derived from said first and second outputs thereof are substantially 180° out-of-phase with each other, means for applying said given frequency signal to said first input of said phase delay means only in response to said first antenna means receiving said electromagnetic energy of said first polarization and for applying said given frequency signal to said second input of said phase delay means only in response to said second antenna means receiving said electromagnetic energy of said second polarization, and means for applying the output signal from said first output of said phase delay means as the first input to both said correlator and said summing detector and applying the output signal from said second output of said phase delay means as the second input to both said correlator and said summing detector.

11. The data transmission system defined in claim 10, wherein said phase delay means is a hybrid ring.

12. The data transmission system defined in claim 10, wherein said means for applying said given frequency includes a local oscillator, a first mixer coupled to said local oscillator and said first antenna means, a second mixer coupled to said local oscillator and said second antenna means, means for applying the output of said first mixer as said first input to said phase delay means, and means for applying the output of said second mixer as said second input to said phase delay means.

13. The data transmission system defined in claim 1, further including receiving means including first antenna means for receiving electromagnetic energy of said first polarization radiated by said first radiating means, second antenna means for receiving electromagnetic energy of said second polarization radiated by said second radiating means, and detecting means coupled to both said first and second antenna means for producing an output manifesting which antenna means at any given time is receiving said carrier singal.

14. The data transmission system defined in claim 13, wherein said detecting means includes correlation means.

No references cited.

UNITED STATES PATENT OFFICE

CERTIFICATE OF CORRECTION

Patent No. 2,992,427 July 11, 1961

George A. Franco

It is hereby certified that error appears in the above numbered patent requiring correction and that the said Letters Patent should read as corrected below.

Column 2, line 3, for "are reversed only during the presence of a" read -- is applied as a second input to AND gate --; line 63, for "18" read -- 118 --.

Signed and sealed this 5th day of December 1961.

(SEAL)
Attest:

ERNEST W. SWIDER
Attesting Officer

DAVID L. LADD
Commissioner of Patents

USCOMM-DC